US012683418B2

(12) United States Patent
Lim et al.

(10) Patent No.: US 12,683,418 B2
(45) Date of Patent: Jul. 14, 2026

(54) ADAPTIVE VOLTAGE REGULATION WITH MULTIPLE PORTS

(71) Applicant: Renesas Electronics America Inc., Milpitas, CA (US)

(72) Inventors: Sungkeun Lim, Apex, NC (US); Dongwoo Han, Cary, NC (US); Fengshuan Zhou, Cary, NC (US); Yen-Mo Chen, Apex, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 18/967,233

(22) Filed: Dec. 3, 2024

(65) Prior Publication Data

US 2026/0155667 A1       Jun. 4, 2026

(51) Int. Cl.
| | |
|---|---|
| *H02J 7/00* | (2026.01) |
| *H01M 10/46* | (2006.01) |
| *H02J 7/90* | (2026.01) |
| *H02M 3/335* | (2006.01) |

(52) U.S. Cl.
CPC .............. *H02J 7/865* (2026.01); *H01M 10/46* (2013.01); *H02J 7/933* (2026.01); *H02M 3/33584* (2013.01); *H02J 2207/20* (2020.01)

(58) Field of Classification Search
CPC .. H02J 7/0068; H02J 7/00712; H02J 2207/20; H02J 7/865; H02J 7/933; H02J 7/90; H02J 7/00; H01M 10/46; H01M 3/33584; H02M 3/33584; H02M 3/335
See application file for complete search history.

(56) References Cited

FOREIGN PATENT DOCUMENTS

CN        115842385 A   *   3/2023   .............. H02J 7/342

* cited by examiner

*Primary Examiner* — Robert L Deberadinis
(74) *Attorney, Agent, or Firm* — SCULLY, SCOTT, MURPHY & PRESSER, P.C.

(57) ABSTRACT

Systems and methods for adaptive voltage regulation with multiple ports are described. The device can include a first voltage regulator coupled to a first port and can regulate voltages between the first port and a battery. The device can further include a second voltage regulator coupled to a second port and can regulate voltages between the second port and the battery. The device can also include a bypass switch coupled to the first voltage regulator, the first port, the second voltage regulator and the second port. The device can further include an integrated circuit configured to operate the bypass switch. When the bypass switch can be turned on, the first voltage regulator can be further configured to regulate voltages between the second port and the battery. The second voltage regulator can be further configured to regulate voltages between the first port and the battery.

17 Claims, 4 Drawing Sheets

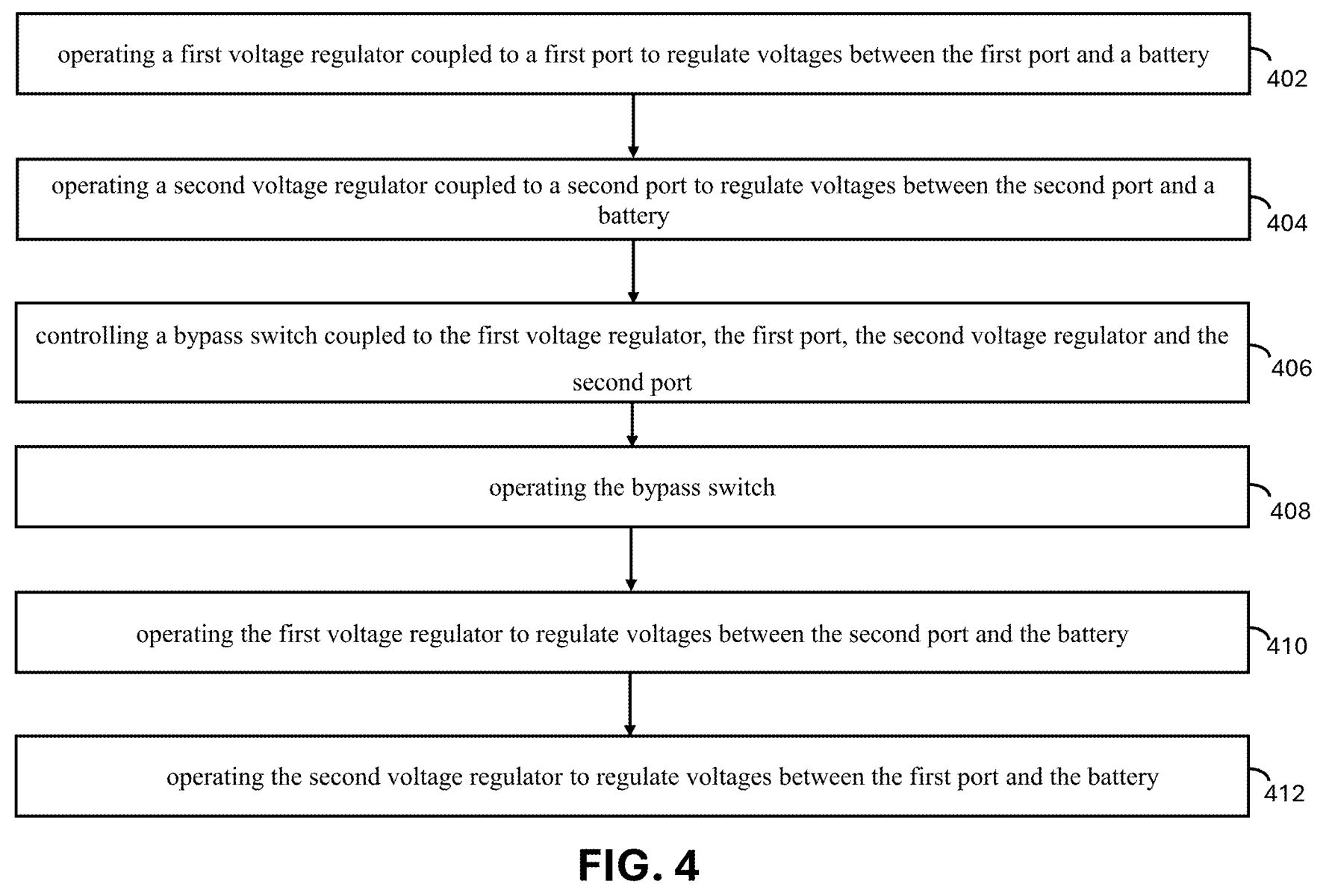

402 operating a first voltage regulator coupled to a first port to regulate voltages between the first port and a battery 404 operating a second voltage regulator coupled to a second port to regulate voltages between the second port and a battery 406 controlling a bypass switch coupled to the first voltage regulator, the first port, the second voltage regulator and the second port 408 operating the bypass switch 410 operating the first voltage regulator to regulate voltages between the second port and the battery 412 operating the second voltage regulator to regulate voltages between the first port and the battery

FIG. 4

ADAPTIVE VOLTAGE REGULATION WITH MULTIPLE PORTS

BACKGROUND

The present disclosure relates in general to consumer, industrial, and hand-held computing, and more particularly to battery chargers for systems having two or more Universal Serial Bus (USB) ports.

Current battery charger or voltage regulator products support systems having multiple USB ports to allow a connection between an external device and the charger system. USB ports are standardized to allow power and data to be transferred through the USB connections. Various types of USB ports are available, and presently, USB Type-C ports are the most commonly used port.

SUMMARY

In one embodiment, a semiconductor device that implement adaptive voltage regulation with multiple ports is generally described. The semiconductor device can include a first voltage regulator coupled to a first port. The first voltage regulator can be configured to regulate voltages between the first port and a battery. The semiconductor device can further include a second voltage regulator coupled to a second port. The second voltage regulator can be configured to regulate voltages between the second port and the battery. The semiconductor device can also include a bypass switch coupled to the first voltage regulator, the first port, the second voltage regulator and the second port. The semiconductor device can further include an integrated circuit configured to operate the bypass switch. When the bypass switch can be turned on, the first voltage regulator can be further configured to regulate voltages between the second port and the battery. The second voltage regulator can be further configured to regulate voltages between the first port and the battery.

In one embodiment, a system that implement adaptive voltage regulation with multiple ports is generally described. The system can include a battery, a first port, and a second port. The system can further include a battery charger. The battery charger can include a first voltage regulator coupled to the first port. The first voltage regulator can be configured to regulate voltages between the first port and the battery. The battery charger can also include a second voltage regulator coupled to the second port. The second voltage regulator can be configured to regulate voltages between the second port and the battery. The battery charger can further include a bypass switch coupled to the first voltage regulator, the first port, the second voltage regulator and the second port. The battery charger can also include an integrated circuit configured to operate the bypass switch. When the bypass switch can be turned on, the first voltage regulator can be further configured to regulate voltages between the second port and the battery. The second voltage regulator can be further configured to regulate voltages between the first port and the battery.

In one embodiment, a method that can implement adaptive voltage regulation with multiple ports is generally described. The method can include operating a first voltage regulator coupled to a first port to regulate voltages between the first port and a battery. The method can further include operating a second voltage regulator coupled to a second port to regulate voltages between the second port and a battery. The method can also include controlling a bypass switch coupled to the first voltage regulator, the first port, the second voltage regulator and the second port. The method can further include operating the bypass switch. When the bypass switch can be turned on, the method can include operating the first voltage regulator to regulate voltages between the second port and the battery. The method can also include operating the second voltage regulator to regulate voltages between the first port and the battery.

BRIEF DESCRIPTION OF THE DRAWINGS

FIG. 4 is a flow chart illustrating a process to implement adaptive voltage regulation with multiple ports in one example embodiment

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
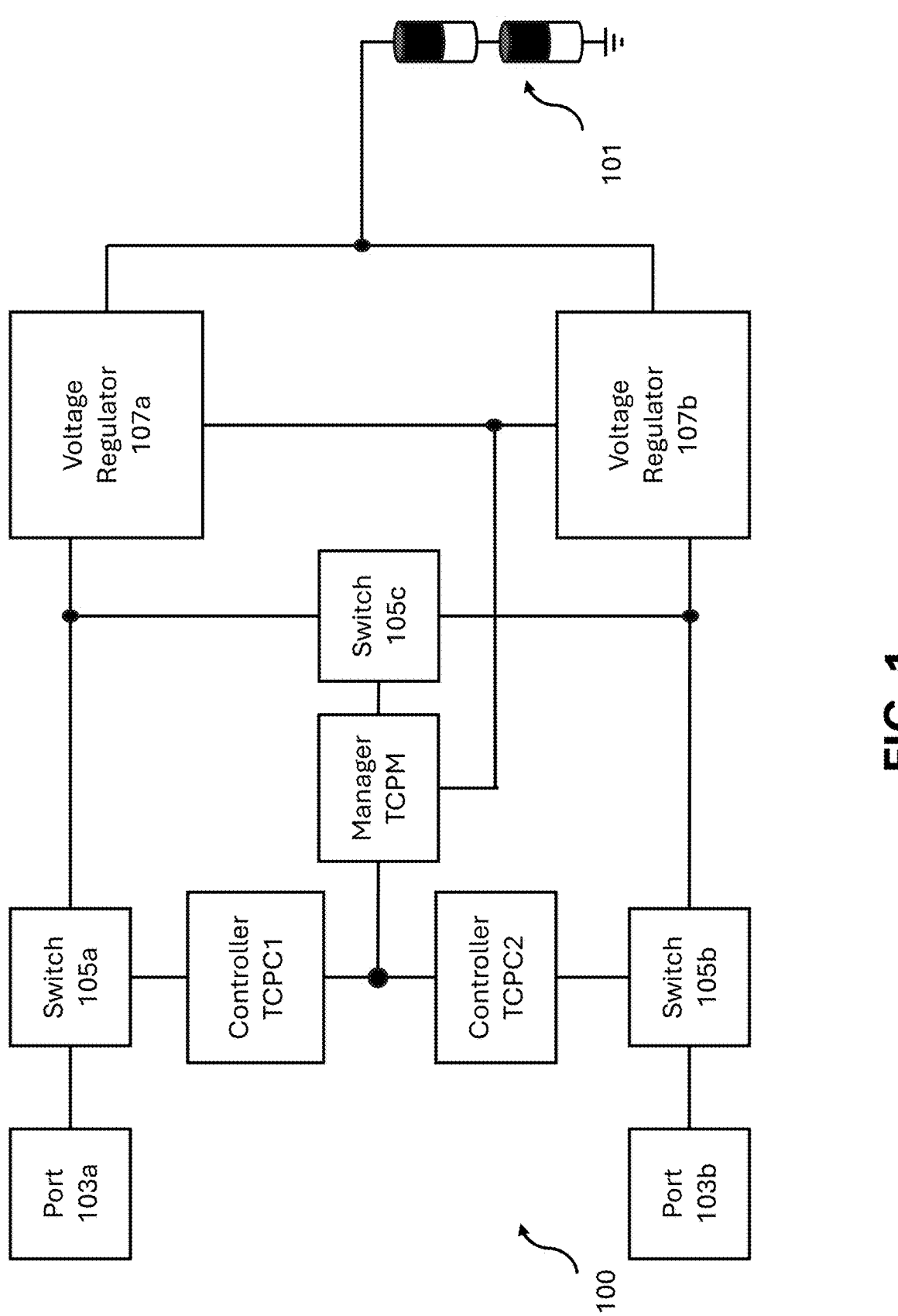
FIG. 1 is a diagram showing a system that can implement adaptive voltage regulation with multiple ports in one embodiment.

FIG. 1 is a diagram showing a system that can implement adaptive voltage regulation with multiple ports in one embodiment. A system 100 shown in FIG. 1 can be a battery charger system, that can support multiple battery applications with multiple Universal Serial Bus (USB) Type-C ports. System 100 can be a battery charger system in a computing device such as a laptop computer, tablet device, cellular phone such as a smartphone, power bank, or any system using a battery and capable of receiving power from a power adapter.

System 100 can include at least one battery cell 101, at least two ports 103a, 103b (hereinafter "ports 103"), at least three switches 105a, 105b, 105c, that can be back-to-back (B2B) switches or single-side switches depending on the application of system 100, at least two Type-C port controllers TCPC1, TCPC2 (hereinafter "controllers TCPC"), a Type-C port manager TCPM (hereinafter "manager TCPM"), and at least two voltage regulators 107a, 107b (hereinafter "voltage regulators "VR"). The three switches 105a, 105b, 105c can be collectively referred to as "B2B switches 105" herein.

Ports 103 can be configured to be USB Type-C ports. An external device can be connected to system 100 via ports 103. Both data and power can be transferred between the external device and system 100 via ports 103.

Controllers TCPC can comprise of hardware components configured to be integrated circuits. The controllers TCPC can be configured to detect the presence and type of device connected to the corresponding ports 103, e.g., controller TCPC1 connected to port 103a and controller TCPC2 connected to port 103b. The controllers TCPC can further be configured to control the corresponding B2B switches 105a, 105b by turning them ON and OFF and communicate with the manager TCPM. In an example embodiment, controller TCPC1 can be configured to monitor and control port 103a and B2B switch 105a. Controller TCPC2 can be configured to monitor and control port 103b and B2B switch 105b.

Manager TCPM can be an integrated circuit configured to control the voltage regulators 107a, 107b and can be configured to manage the power configurations of system 100 such as determining whether a power adapter, e.g., power supply, is connected to one of the ports 103 or communicating battery statuses of battery cells 101 to the controllers TCPC and/or voltage regulators 107a, 107b. Voltage regulators 107a, 107b can be configured to manage the supply of power from ports 103 to battery cells 101 in modes such as a buck mode, boost mode, buck-boost mode or other voltage regulation modes. By way of example, each one of voltage regulators 107a, 107b can be configured to perform bi-directional voltage conversion. The voltage regulators 107a, 107b can convert voltages provided at ports 103 into a voltage level suitable for charging battery cells 101, and can also operate in reverse to convert voltage from battery cells 101 into a voltage level suitable for charging external devices connected to the ports 103. Each one of voltage regulators 107a, 107b can be controlled to implement various feedback loops, such as voltage feedback loop and current feedback loop, to adjust and optimize pulse width modulation (PWM) signals being used for driving power MOSFETs in voltage regulators 107a, 107b.

In the embodiment shown in FIG. 1, each one of B2B switches 105 can include a pair (e.g., two) of switches. In the example embodiment shown in FIG. 1, each B2B switch is configured to be bi-directional switches, arranged in a back-to-back, or series, configuration. In another embodiment, switches 105a and 105b can also be configured to be single side switches instead of bi-directional switches. Each pair of switches in B2B switches 105 can be P-channel or N-channel Metal Oxide Semiconductor Field Effect Transistors (MOSFETs) or Insulated-Gate Bipolar Transistors (IGBTs), connected in-series at their source channels or drain channels. For example, the B2B switches 105 can include two P-channel MOSFETs with their source channels connected in series. When turned on, the B2B switches 105 can allow a two-way bidirectional flow of current. When turned off, the two-way bidirectional flow of current is blocked. In an example embodiment, when B2B switch 105a is turned ON and B2B switch 105b is turned OFF, a first current path is formed between port 103a and voltage regulator 107a. When B2B switch 105b is turned ON and B2B switch 105a is turned OFF, a second current path is formed between port 103b and voltage regulator 107b. To be described in more detail below, a third B2B switch 105c can be positioned between the first current path and the second current path. The third B2B switch 105c is a bi-directional switch that can be a bypass switch controlled by the manager TCPM to turn ON and OFF by request, such as based on power demanded by one or more external devices connected to ports 103. When B2B switch 105c is turned ON, B2B switch 105a is turned ON, and B2B switch 105b is turned OFF, a third current path is formed between port 103a and voltage regulator 107b. When B2B switch 105c is turned ON, B2B switch 105a is turned OFF, and B2B switch 105b is turned ON, a fourth current path is formed between port 103b and voltage regulator 107a.

In conventional dual port systems without the third B2B switch 105c, each voltage regulator in the first current path and the second current path can have different power capabilities, such as providing individual amount of maximum power to external devices connected to their respective ports. For example, when the first current path is formed, voltage regulator 107a can provide up to X watts to an external device connected to port 103a. When the second current path is formed, voltage regulator 107b can provide up to Y watts to an external device connected to port 103b, where X and Y can be the same or different. However, to prepare for situations where external devices connected to the ports 103 require higher power, the voltage regulators 107a, 107b may need to be designed to have larger inductors, which may not be desirable. The larger inductors can lead to larger device size, costlier bill-of-materials (BOM), and degraded thermal performance.

To address the challenge of supporting external devices that require higher power, the third B2B switch 105c can be added between the first and second current paths. The third B2B switch 105c can be implemented as a bypass circuit, allowing both voltage regulators 107a, 107b to contribute to the total power required by external devices connected to ports 103. For instance, if an external device requires power greater than power capability of a single voltage regulator (e.g., one of voltage regulators 107a, 107b), B2B switch 105c can be turned on to allow both voltage regulators 107a, 107b to contribute power to the external device. The inclusion of B2B switch 105c can allow the use of voltage regulators with lower individual power capabilities, resulting in decreased component sizes (e.g., smaller inductors), reduced BOM costs, and improved thermal performance.

Figure 2:
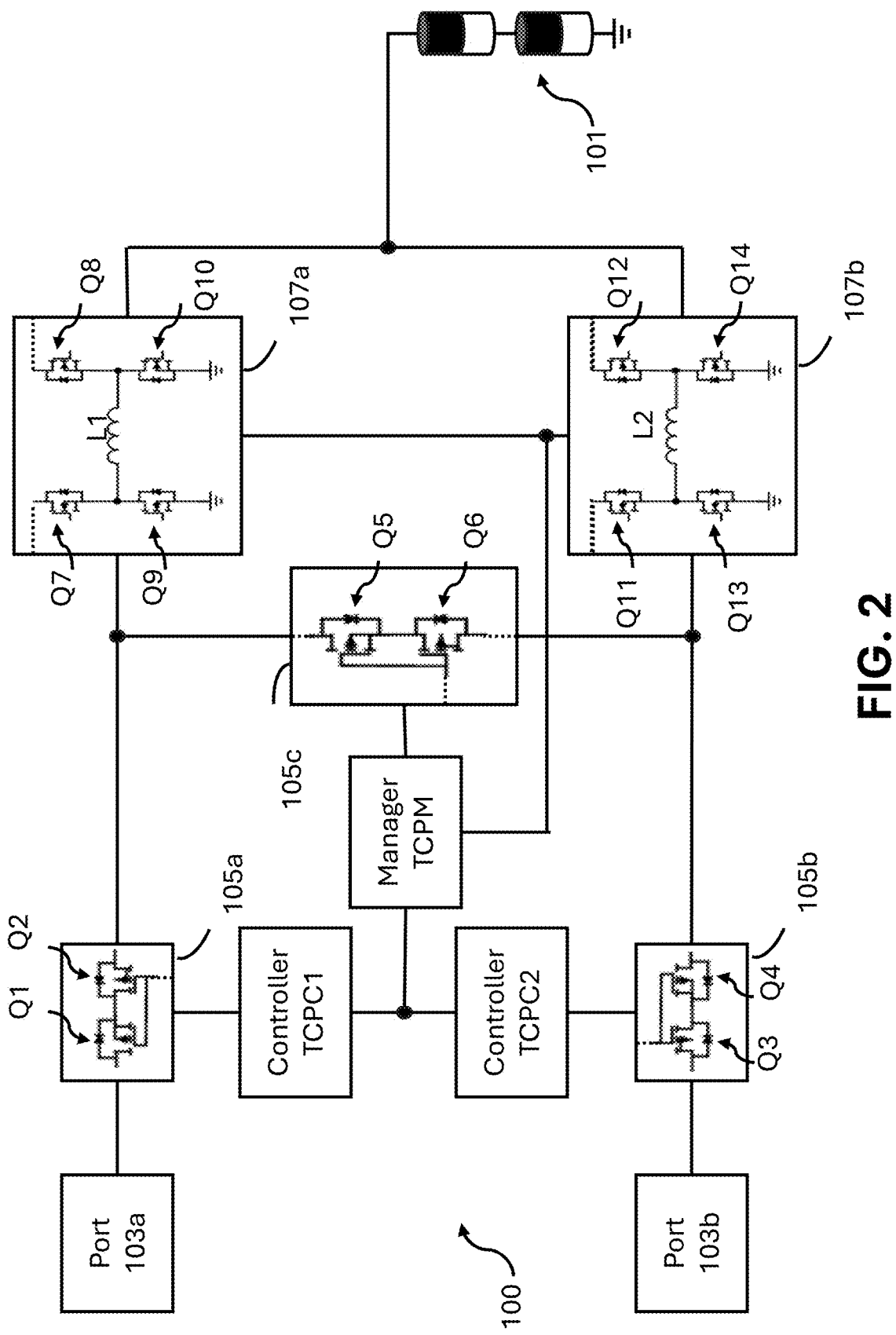
FIG. 2 is a diagram showing an example implementation of adaptive voltage regulation with multiple ports in one embodiment.

FIG. 2 is a diagram showing an example implementation of adaptive voltage regulation with multiple ports in one example embodiment. Descriptions of FIG. 2 may reference components shown in FIG. 1. In this example embodiment, the three B2B switches 105, can comprise of a pair of MOSFETs. More specifically, B2B switch 105a can comprise of two p-type MOSFETS Q1 and Q2. B2B switch 105b can comprise of two p-type MOSFETS Q3 and Q4. B2B switch 105c can comprise of two p-type MOSFETS Q5 and Q6. Each pair of MOSFETS of B2B switches 105 are connected together at their source channels. The drain of MOSFET Q1 can be configured to be connected to port 103a and the drain of MOSFET Q2 can be configured to be connected to voltage regulator 107a. The gate channels of MOSFETs Q1, Q2 are connected to controller TCPC1. The drain of MOSFET Q3 can be configured to be connected to port 103b and the drain of MOSFET Q4 can be configured to be connected to voltage regulator 107b. The gate channels of MOSFETs Q3, Q4 are connected to controller TCPC2.

The voltage regulators 107a and 107b in this example embodiment can include inductors, capacitors, and MOSFETs. 107a can include an inductor L1 and four MOSFETs Q7, Q8, Q9, Q10. 107b can include an inductor L2 and four MOSFETs Q11, Q12, Q13, Q14. Voltage regulators 107a and 107b can be bi-directional buck-boost converters with four MOSFETs configured as a full-bridge circuit. In an aspect, a bi-directional buck-boost converter can step down or step up voltages in both forward direction (from ports 103 to battery cells 101) and reverse direction (from battery cells 101 to ports 103).

In the example embodiment shown in FIG. 2, when the third B2B switch 105c is connected between the first and second current paths of system 100, one or more of voltage regulators 107a, 107b can provide power to either port 103a and/or port 103b. By way of example, voltage regulator 107a can have a power capability of X watts and voltage regulator 107b can have a power capability of Y watts. If port 103a requires power that is less than or equal to X watts, controller TCPC1 can be configured to turn ON B2B switch 105*a* to allow voltage regulator 107*a* to support port 103*a*. If port 103*a* requires power that is greater than X watts, then controller TCPC1 can be configured to turn ON B2B switch 105*a* and manager TCPM can be configured to turn ON B2B switch 105*c* to allow both voltage regulators 107*a*, 107*b* to support port 103*a*. In response to turning on B2B switch 105*c*, power being provided by voltage regulators 107*a*, 107*b* can be summed together at port 103*a* to provide power greater than X watts. In another example, voltage regulator 107*a* can have a power capability of X and voltage regulator 107*b* can have a power capability of Y, where Y>X. If port 103*a* requires Y watts of power, controller TCPC1 can be configured to turn ON B2B switches 105*a* and manager TCPM can be configured to turn ON B2B switch 105*c*, and manager TCPM can stop switching voltage regulator 107*a*, such that voltage regulator 107*b* can support port 103*a* via the third current path. Therefore, the two voltage regulators 107*a*, 107*b* can be capable of handling up to Z watts of power, where Z=X+Y, without utilizing large inductors in voltage regulators 107*a*, 107*b*.

In another example embodiment, when B2B switch 105*c* is turned on, voltage regulators 107*a*, 107*b* can provide unequal amounts of power to the same port to acquire the same total power requirements. For example, if a total of P watts is required at a port, where P is less than a sum of X and Y, then manager TCPM can control voltage regulator 107*a* to step down the power capability of X watts and manager TCPM can control voltage regulator 107*b* to step down the power capability of Y watts, where the stepped down power of X and Y can sum to P. The amount of step down or step up performed by manager TCPM can be dependent on feedback information received by the TCPM. By turning on B2B switch 105*c* to allow each one of voltage regulators 107*a*, 107*b* to provide stepped down power, the thermal performance of the overall system 100 can be improved because the voltage regulators 107*a*, 107*b* may not need to operate to provide maximum power.

In another example embodiment, an external device can be connected to port 103*a*. When manager TCPM detects the connection at port 103*a* and port 103*a* demands power greater than the power capabilities of voltage regulator 107*a*, the manager TCPM can be configured to turn ON the third B2B switch 105*c*. When a second external device is connected to port 103*b* while the first external device is connected to the port 103*a*, manager TCPM can be configured to turn OFF B2B switch 105*c*, negotiate with the second external device on the power to be delivered to the second external device, and turn ON B2B switch 105*b* when the negotiation is concluded. Therefore, the first external device can be connected to the voltage regulator 107*a* via the first path and the second external device can be connected to the voltage regulator 107*b* via the second path.

Figure 3:
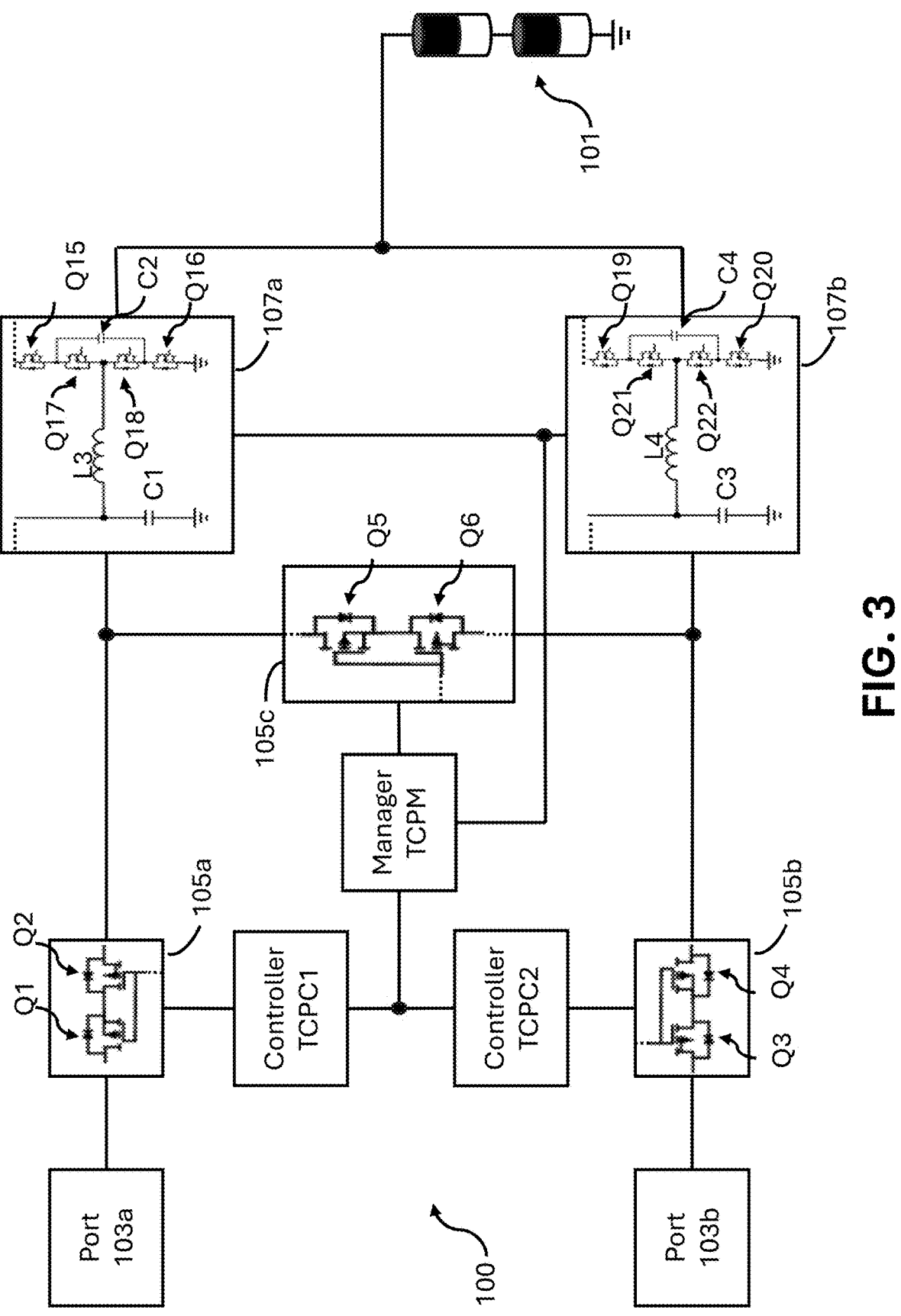
FIG. 3 is a diagram showing another example implementation of adaptive voltage regulation with multiple ports in one embodiment.

FIG. 3 is a diagram showing another example implementation of adaptive voltage regulation with multiple ports in one embodiment. Descriptions of FIG. 3 may reference components shown in FIG. 1-2. In the example embodiment shown in FIG. 3, each one of B2B switches 105 can comprise of back-to-back MOSFETS configured in a similar manner as shown in FIG. 2.

The voltage regulators 107*a* and 107*b* in the example embodiment of FIG. 3 can include inductors, capacitors, and MOSFETs. Voltage regulator 107*a* can include an inductor L1, two capacitors C1 and C2, and four MOSFETs Q7, Q8, Q9, Q10. Voltage regulator 107*b* can include an inductor L2, two capacitors C3 and C4, and four MOSFETs Q11, Q12, Q13, Q14. Voltage regulators 107*a*, 107*b* can be a bi-directional 3-level buck converter with the four MOSFETs configured in series. The 3-level buck converter can output three constant voltage levels. The three levels can be the high input voltage Vin, low ground voltage, and a mid-level voltage equal to half of the input voltage.

When the third B2B switch 105*c* is connected between the first and second current paths of system 100, one or more of voltage regulators 107*a*, 107*b* can provide power to either port 103*a* and/or port 103*b*. By way of example, voltage regulator 107*a* can have a power capability of 70 watts and voltage regulator 107*b* can have a power capability of 70 watts. If port 103*a* requires power that is less than or equal to 70 watts, controller TCP1 can be configured to turn ON B2B switch 105*a* to allow voltage regulator 107*a* to support port 103*a*. If port 103*a* requires power that is greater than 70 watts, e.g., 140 watts, then controller TCPC1 can be configured to turn ON B2B switches 105*a* and manager TCPM can be configured to turn ON B2B switch 105*c* to allow both voltage regulators 107*a*, 107*b* to support port 103*a*. In response to turning on B2B switch 105*c*, power being provided by voltage regulators 107*a*, 107*b* can be summed together, e.g., 70 watts+70 watts=140 watts at port 103*a* to provide power greater than 70 watts. In another example, voltage regulator 107 can have a power capability of 70 watts and voltage regulator 107*b* can have a power capability of 100 watts. If port 103*a* requires 100 watts of power, controller TCP1 can be configured to turn ON B2B switches 105*a* and 105*c*, and manager TCPM can stop switching voltage regulator 107*a*, such that voltage regulator 107*b* can support port 103*a* via the third current path. Therefore, the two voltage regulators 107*a*, 107*b* can be capable of handling up to 170 watts of power, where 170=70+100.

In another example embodiment voltage regulators 107*a*, 107*b* can implement different methods of voltage regulations. For example, system 100 can comprise of a voltage regulator 107*a* that can be a 3-Level Buck Converter and a voltage regulator 107*b* that can be a buck-boost converter. In another example embodiment, system 100 can comprise of a three or more ports. For example, the first port 103*a* and the second port 103*b* are among a plurality of ports 103 comprising at least two ports. The third B2B switch 105*c* is among a plurality of bypass switches and each one of the plurality of B2B switches 105 are coupled to a pair of ports among the plurality of ports 103. By way of example, if there are N ports in system 100, then there can be N−1 bypass switches in system 100. In an aspect, for every additional port comprised in system 100, an additional controller TCPC is connected to the additional port, two additional B2B switches 105, and an additional voltage regulator 107. The additional port is connected to the first additional B2B switches 105 and the additional voltage regulator 107 to form a new fifth path. The second additional B2B switch 105 is connected between the first additional B2B switch 105 and the additional voltage regulator 107 to form a new current path between the second current path and the new fifth path.

FIG. 4 is a flow chart illustrating a process to implement adaptive voltage regulation with multiple ports in one example embodiment. A process 400 in FIG. 4 may be implemented using, for example, system 100 as described above. Process 400 can include one or more operations, actions, or functions as illustrated by one or more of blocks 402, 404, 406, 408, 410, and/or 412. Although illustrated as discrete blocks, various blocks may be divided into additional blocks, combined into fewer blocks, eliminated, performed in different order, or performed in parallel, depending on the desired implementation.

Process 400 can be performed by an integrated circuit. Process 400 can begin at block 402, where the integrated circuit can operate a first voltage regulator coupled to a first port to regulate voltages between the first port and a battery. The process 400 can continue from block 402 to block 404. At block 404, the integrated circuit can operate a second voltage regulator coupled to a second port to regulate voltages between the second port and a battery. The process 400 can continue from block 404 to block 406. At block 406, the integrated circuit can control a bypass switch coupled to the first voltage regulator, the first port, the second voltage regulator and the second port. The process 400 can continue from block 406 to block 408. At block 408, the integrated circuit can operate the bypass switch. When the bypass switch be turned on, the process 400 can continue from block 408 to block 410. At block 410, the integrated circuit can operate the first voltage regulator to regulate voltages between the second port and the battery. The process 400 can continue from block 410 to block 412. At block 412, the integrated circuit can operate the second voltage regulator to regulate voltages between the first port and the battery.

In another embodiment, the integrated circuit can further operate a first switch coupled between the first voltage regulator and the first port, and operate a second switch coupled between the second voltage regulator and the second port. When the bypass switch be turned off, the integrated circuit can further turn on the first switch and turn off the second switch to form a first current path comprising of the first switch, first voltage regulator, and first port. The integrated circuit can turn off the first switch and turn on the second switch to form a second current path comprising of the second switch, second voltage regulator, and second port.

In another embodiment, the integrated circuit can further turn on the bypass switch coupled between the first current path and the second current path. When turning on the bypass switch, the integrated circuit can further turn on the first switch and turn off the second switch to form a third current path comprising of the first switch, the second voltage regulator, and the first port. The integrated circuit can turn off the first switch and turn on the second switch to form a fourth current path comprising of the second switch, the first voltage regulator, and the second port.

In another embodiment, the integrated circuit can further operate the first voltage regulator to produce a first power, and operate the second voltage regulator to produce a second power. The integrated circuit can also turn on the bypass switch to supply a combination of the first power and the second power to an external device connected to one of the first port and the second port. The external device can demand a power that be greater than a first power capacity of the first voltage regulator and greater than a second power capacity of the second voltage regulator.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLES

Example 1: A semiconductor device comprising: a first voltage regulator coupled to a first port, wherein the first voltage regulator is configured to regulate voltages between the first port and a battery; a second voltage regulator coupled to a second port, wherein the second voltage regulator is configured to regulate voltages between the second port and the battery; a bypass switch coupled to the first voltage regulator, the first port, the second voltage regulator and the second port; a controller configured to operate the bypass switch, wherein when the bypass switch is turned on: the first voltage regulator is further configured to regulate voltages between the second port and the battery; and the second voltage regulator is further configured to regulate voltages between the first port and the battery.

Example 2: The semiconductor device of example 1, further comprising: a first switch coupled between the first voltage regulator and the first port; a second switch coupled between the second voltage regulator and the second port; and wherein the controller is configured to, when the bypass switch is turned off: turn on the first switch and turn off the second switch to form a first current path comprising of the first switch, first voltage regulator, and first port; and turn off the first switch and turn on the second switch to form a second current path comprising of the second switch, second voltage regulator, and second port.

Example 3: The semiconductor device of any one of examples 1 to 2, wherein: the bypass switch is coupled between the first current path and the second current path, wherein the controller is further configured to: turn on the first switch, turn off the second switch, and turn on the bypass switch to form a third current path comprising of the first switch, the second voltage regulator, and the first port; and turn off the first switch, turn on the second switch, and turn on the bypass switch to form a fourth current path comprising of the second switch, the first voltage regulator, and the second port.

Example 4: The semiconductor device of any one of examples 1 to 3, wherein when the bypass switch is turned on: the first voltage regulator is configured to output regulated power to the first port and the second port; and the second voltage regulator is configured to output regulated power to the first port and the second port.

Example 5: The semiconductor device of any one of examples 1 to 4, wherein at least one of the first voltage regulator and the second voltage regulator is a bi-directional buck-boost converter.

Example 6: The semiconductor device of any one of examples 1 to 5, wherein at least one of the first voltage regulator and the second voltage regulator is a bi-directional 3-level buck converter.

Example 7: The semiconductor device of any one of examples 1 to 6, wherein: the first port and the second port are among a plurality of ports comprising at least two ports; the bypass switch is among a plurality of bypass switches; and each one of the plurality of bypass switches are coupled to a pair of ports among the plurality of ports.

Example 8: The semiconductor device of any one of examples 1 to 8, wherein: an external device is connected to one of the first port and the second port; the external device demands a power that is greater than a first power capacity of the first voltage regulator and greater than a second power capacity of the second voltage regulator; when the bypass switch is turned on, a first power produced by the first voltage regulator and a second power produced by the second voltage regulator are combined to supply the demanded power to the external device.

Example 9: A system comprising: a battery; a first port; a second port; a battery charger comprising: a first voltage regulator coupled to the first port, wherein the first voltage regulator is configured to regulate voltages between the first port and the battery; a second voltage regulator coupled to the second port, wherein the second voltage regulator is configured to regulate voltages between the second port and the battery; a bypass switch coupled to the first voltage regulator, the first port, the second voltage regulator and the second port; a controller configured to operate the bypass switch, wherein when the bypass switch is turned on: the first voltage regulator is further configured to regulate voltages between the second port and the battery; and the second voltage regulator is further configured to regulate voltages between the first port and the battery.

Example 10: The system of example 9, wherein the battery charger further comprises: a first switch coupled between the first voltage regulator and the first port; a second switch coupled between the second voltage regulator and the second port; and wherein the controller is configured to, when the bypass switch is turned off: turn on the first switch and turn off the second switch to form a first current path comprising of the first switch, first voltage regulator, and first port; and turn off the first switch and turn on the second switch to form a second current path comprising of the second switch, second voltage regulator, and second port.

Example 11: The system of any one of examples 9 to 10, wherein: the bypass switch is coupled between the first current path and the second current path, wherein the controller is further configured to: turn on the first switch, turn off the second switch, and turn on the bypass switch to form a third current path comprising of the first switch, the second voltage regulator, and the first port; and turn off the first switch, turn on the second switch, and turn on the bypass switch to form a fourth current path comprising of the second switch, the first voltage regulator, and the second port.

Example 12: The system of any one of examples 9 to 11, wherein when the bypass switch is turned on: the first voltage regulator is configured to output regulated power to the first port and the second port; and the second voltage regulator is configured to output regulated power to the first port and the second port.

Example 13: The system of any one of examples 9 to 12, wherein at least one of the first voltage regulator and the second voltage regulator is a bi-directional buck-boost converter.

Example 14: The system of any one of examples 9 to 13, wherein at least one of the first voltage regulator and the second voltage regulator is a bi-directional 3-level buck converter.

Example 15: The system of any one of examples 9 to 14, wherein: the first port and the second port are among a plurality of ports comprising at least two ports; the bypass switch is among a plurality of bypass switches; and each one of the plurality of bypass switches are coupled to a pair of ports among the plurality of ports Example 16: The semiconductor device of any one of examples 9 to 15, wherein: an external device is connected to one of the first port and the second port; the external device demands a power that is greater than a first power capacity of the first voltage regulator and greater than a second power capacity of the second voltage regulator; when the bypass switch is turned on, a first power produced by the first voltage regulator and a second power produced by the second voltage regulator are combined to supply the demanded power to the external device.

Example 17: A method comprising: operating a first voltage regulator coupled to a first port to regulate voltages between the first port and a battery; operating a second voltage regulator coupled to a second port to regulate voltages between the second port and a battery; controlling a bypass switch coupled to the first voltage regulator, the first port, the second voltage regulator and the second port; operating the bypass switch, wherein when the bypass switch is turned on: operating the first voltage regulator to regulate voltages between the second port and the battery; and operating the second voltage regulator to regulate voltages between the first port and the battery.

Example 18: The method of example 17, further comprising: operating a first switch coupled between the first voltage regulator and the first port; operating a second switch coupled between the second voltage regulator and the second port; and wherein when the bypass switch is turned off, the method further comprises: turning on the first switch and turning off the second switch to form a first current path comprising of the first switch, first voltage regulator, and first port; and turning off the first switch and turning on the second switch to form a second current path comprising of the second switch, second voltage regulator, and second port.

Example 19: The method of any one of examples 17 to 18, further comprising: turning on the bypass switch coupled between the first current path and the second current path, wherein when turning on the bypass switch, the method further comprises: turning on the first switch and turning off the second switch to form a third current path comprising of the first switch, the second voltage regulator, and the first port; and turning off the first switch and turning on the second switch to form a fourth current path comprising of the second switch, the first voltage regulator, and the second port.

Example 20: The method of any one of examples 17 to 19, further comprising: operating the first voltage regulator to produce a first power; operating the second voltage regulator to produce a second power; turning on the bypass switch to supply a combination of the first power and the second power to an external device connected to one of the first port and the second port, wherein the external device demands a power that is greater than a first power capacity of the first voltage regulator and greater than a second power capacity of the second voltage regulator.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:

a first voltage regulator coupled to a first port, wherein the first voltage regulator is configured to regulate voltages between the first port and a battery;

a second voltage regulator coupled to a second port, wherein the second voltage regulator is configured to regulate voltages between the second port and the battery;

a bypass switch coupled to the first voltage regulator, the first port, the second voltage regulator and the second port; and a controller configured to determine power demands at the first port and the second port and operate the bypass switch, the first voltage regulator and the second voltage regulator, wherein, when a power demand at one of the first port and the second port is greater than a power capacity of the first voltage regulator and a power capacity of the second voltage regulator, the controller is configured to:

turn on the bypass switch to connect the first voltage regulator to the second port and to connect the second voltage regulator to the first port; and operate both the first voltage regulator and the second voltage regulator to supply the power demand, wherein, when the power demand at the first port is greater than the power capacity of the first voltage regulator and less than the power capacity of the second voltage regulator, the controller is configured to:

turn on the bypass switch to connect the second voltage regulator to the first port;

suspend operation of the first voltage regulator; and operate the second voltage regulator to supply the power demand at the first port, and wherein, when the power demand at the second port is greater than a power capacity of the second voltage regulator and less than a power capacity of the first voltage regulator, the controller is configured to:

turn on the bypass switch to connect the first voltage regulator to the second port;

suspend operation of the second voltage regulator; and operate the first voltage regulator to supply the power demand at the second port.

2. The semiconductor device of claim 1, wherein the controller is a first controller, and the semiconductor device further comprising:

a first switch coupled between the first voltage regulator and the first port;

a second switch coupled between the second voltage regulator and the second port;

a second controller configured to control the first switch; and a third controller configured to control the second switch, wherein when the bypass switch is turned off:

the second controller is configured to turn on the first switch and the third controller is configured to turn off the second switch to form a first current path comprising of the first switch, the first voltage regulator, and the first port; and the second controller is configured to turn off the first switch and the third controller is configured to turn on the second switch to form a second current path comprising of the second switch, the second voltage regulator, and the second port.

3. The semiconductor device of claim 2, wherein:

the bypass switch is coupled between the first current path and the second current path, wherein the first controller is further configured to:

turn on the bypass switch when the first switch is turned on and when the second switch is turned off to form a third current path comprising of the first switch, the second voltage regulator, and the first port; and turn on the bypass switch when the first switch is turned off and when the second switch is turned on to form a fourth current path comprising of the second switch, the first voltage regulator, and the second port.

4. The semiconductor device of claim 1, wherein when the bypass switch is turned on:

the first voltage regulator is configured to output regulated power to the first port and the second port; and the second voltage regulator is configured to output regulated power to the first port and the second port.

5. The semiconductor device of claim 1, wherein at least one of the first voltage regulator and the second voltage regulator is a bi-directional buck-boost converter.

6. The semiconductor device of claim 1, wherein at least one of the first voltage regulator and the second voltage regulator is a bi-directional 3-level buck converter.

7. The semiconductor device of claim 1, wherein:

the first port and the second port are among a plurality of ports comprising at least two ports;

the bypass switch is among a plurality of bypass switches; and each one of the plurality of bypass switches are coupled to a pair of ports among the plurality of ports.

8. A system comprising:

a battery;

a first port;

a second port; and a battery charger comprising:

a first voltage regulator coupled to the first port, wherein the first voltage regulator is configured to regulate voltages between the first port and the battery;

a second voltage regulator coupled to the second port, wherein the second voltage regulator is configured to regulate voltages between the second port and the battery;

a bypass switch coupled to the first voltage regulator, the first port, the second voltage regulator and the second port; and a controller configured to determine power demands at the first port and the second port and operate the bypass switch, the first voltage regulator and the second voltage regulator,

wherein, when a power demand at one of the first port and the second port is greater than a power capacity of the first voltage regulator and a power capacity of the second voltage regulator, the controller is configured to:

turn on the bypass switch to connect the first voltage regulator to the second port and to connect the second voltage regulator to the first port; and operate both the first voltage regulator and the second voltage regulator to supply the power demand, wherein, when the power demand at the first port is greater than the power capacity of the first voltage regulator and less than the power capacity of the second voltage regulator, the controller is configured to:

turn on the bypass switch to connect the second voltage regulator to the first port;

suspend operation of the first voltage regulator; and operate the second voltage regulator to supply the power demand at the first port, and wherein, when the power demand at the second port is greater than a power capacity of the second voltage regulator and less than a power capacity of the first voltage regulator, the controller is configured to:

turn on the bypass switch to connect the first voltage regulator to the second port;

suspend operation of the second voltage regulator; and operate the first voltage regulator to supply the power demand at the second port.

9. The system of claim 8, wherein the controller is a first controller, and the battery charger further comprises:

a first switch coupled between the first voltage regulator and the first port; and a second switch coupled between the second voltage regulator and the second port, a second controller configured to control the first switch; and a third controller configured to control the second switch, wherein, when the bypass switch is turned off:

the second controller is configured to turn on the first switch and the third controller is configured to turn off the second switch to form a first current path comprising of the first switch, the first voltage regulator, and the first port; and the second controller is configured to turn off the first switch and the third controller is configured to turn on the second switch to form a second current path comprising of the second switch, the second voltage regulator, and the second port.

10. The system of claim 9, wherein:

the bypass switch is coupled between the first current path and the second current path, wherein the first controller is further configured to:

turn on the bypass switch when the first switch is turned on and when the second switch is turned off to form a third current path comprising of the first switch, the second voltage regulator, and the first port; and turn on the bypass switch when the first switch is turned off and when the second switch is turned on to form a fourth current path comprising of the second switch, the first voltage regulator, and the second port.

11. The system of claim 8, wherein, when the bypass switch is turned on:

the first voltage regulator is configured to output regulated power to the first port and the second port; and the second voltage regulator is configured to output regulated power to the first port and the second port.

12. The system of claim 8, wherein at least one of the first voltage regulator and the second voltage regulator is a bi-directional buck-boost converter.

13. The system of claim 8, wherein at least one of the first voltage regulator and the second voltage regulator is a bi-directional 3-level buck converter.

14. The system of claim 8, wherein:

the first port and the second port are among a plurality of ports comprising at least two ports;

the bypass switch is among a plurality of bypass switches; and each one of the plurality of bypass switches are coupled to a pair of ports among the plurality of ports.

15. A method comprising:

operating a first voltage regulator coupled to a first port to regulate voltages between the first port and a battery;

operating a second voltage regulator coupled to a second port to regulate voltages between the second port and the battery;

controlling the first voltage regulator, the second voltage regulator, and a bypass switch coupled to the first voltage regulator, the first port, the second voltage regulator and the second port, wherein the controlling comprises:

when a power demand at one of the first port and the second port is greater than a power capacity of the first voltage regulator and a power capacity of the second voltage regulator:

turning on the bypass switch to connect the first voltage regulator to the second port and to connect the second voltage regulator to the first port; and operating both the first voltage regulator and the second voltage regulator to supply the power demand;

when the power demand at the first port is greater than the power capacity of the first voltage regulator and less than the power capacity of the second voltage regulator:

turning on the bypass switch to connect the second voltage regulator to the first port;

suspending operation of the first voltage regulator; and operating the second voltage regulator to supply the power demand at the first port; and when the power demand at the second port is greater than a power capacity of the second voltage regulator and less than a power capacity of the first voltage regulator:

turning on the bypass switch to connect the first voltage regulator to the second port;

suspending operation of the second voltage regulator; and operating the first voltage regulator to supply the power demand at the second port.

16. The method of claim 15, further comprising:

operating a first switch coupled between the first voltage regulator and the first port; and operating a second switch coupled between the second voltage regulator and the second port, wherein, when the bypass switch is turned off, the method further comprises:

turning on the first switch and turning off the second switch to form a first current path comprising of the first switch, the first voltage regulator, and the first port; and

15

16 turning off the first switch and turning on the second switch to form a second current path comprising of the second switch, the second voltage regulator, and the second port.

17. The method of claim 16, further comprising:

turning on the bypass switch coupled between the first current path and the second current path, wherein, when turning on the bypass switch, the method further comprises:

turning on the first switch and turning off the second switch to form a third current path comprising of the first switch, the second voltage regulator, and the first port; and turning off the first switch and turning on the second switch to form a fourth current path comprising of the second switch, the first voltage regulator, and the second port.

\* \* \* \* \*